Patented Nov. 3, 1925.

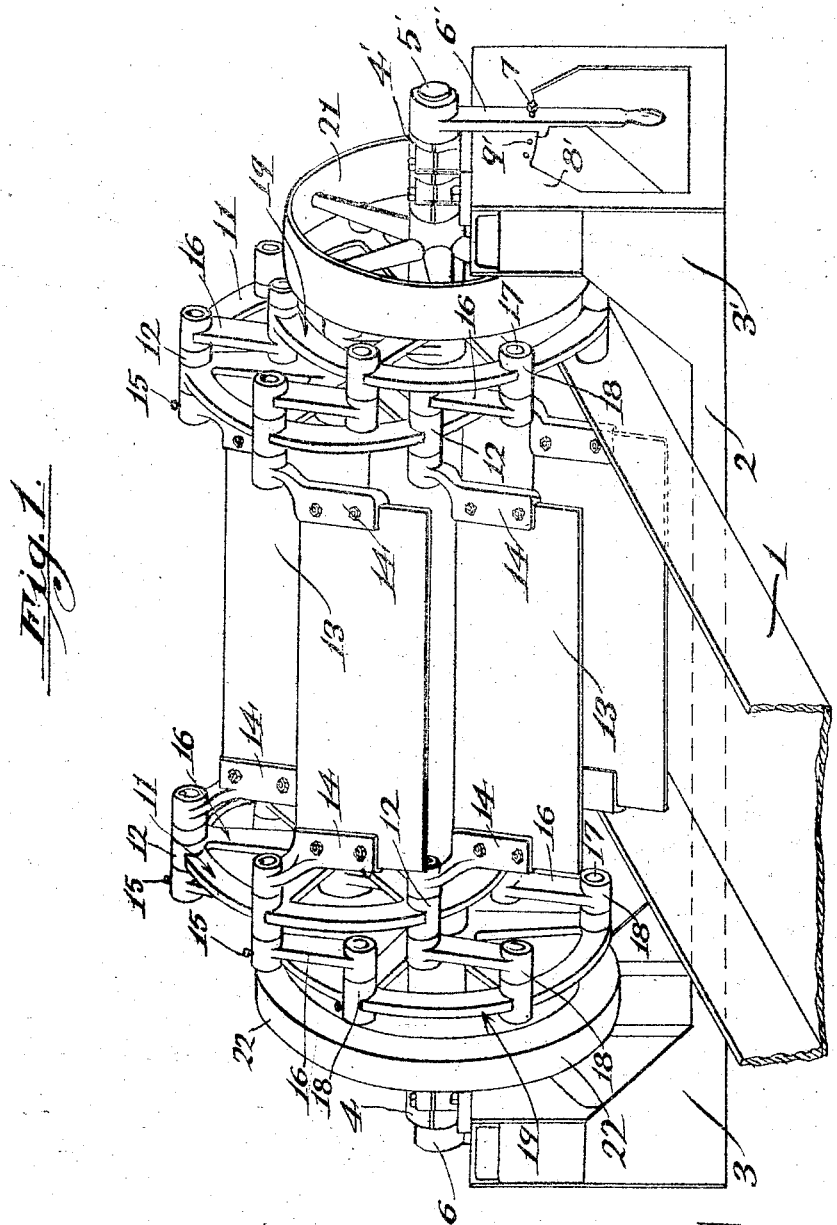

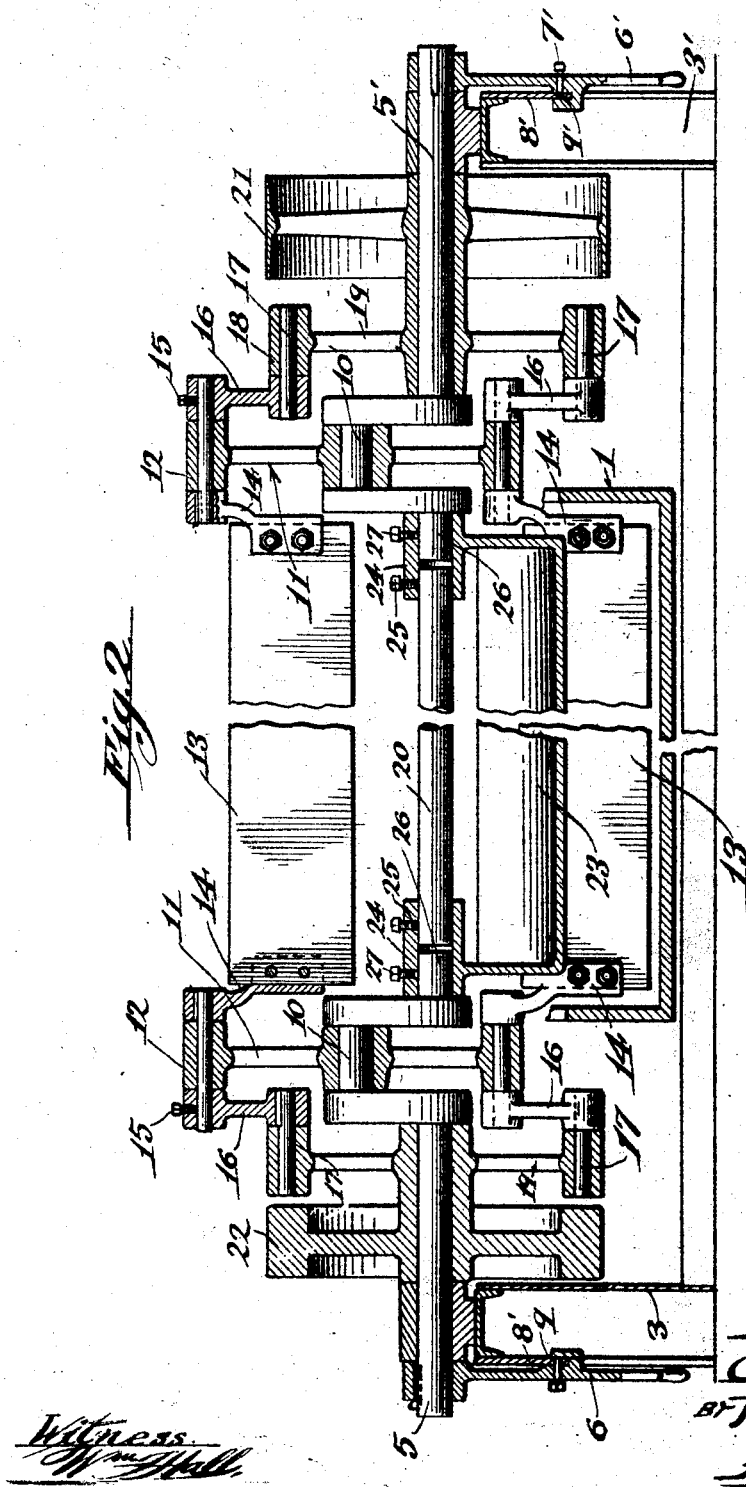

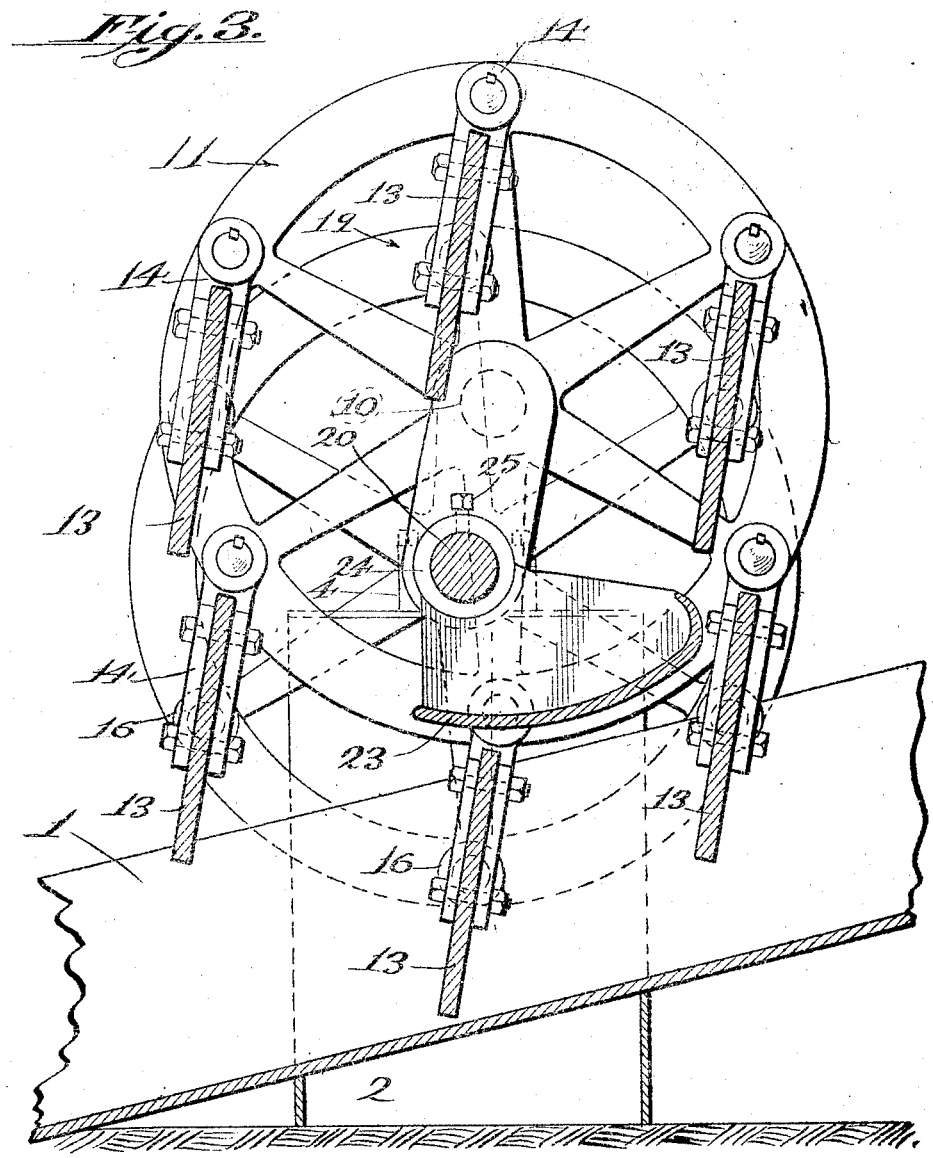

1,560,024

UNITED STATES PATENT OFFICE.

CHESTER P. DENNHARDT, OF LOS ANGELES, CALIFORNIA.

UNDERSHOT WATER WHEEL.

Application filed July 3, 1923. Serial No. 649,298.

*To all whom it may concern:*

Be it known that I, CHESTER P. DENNHARDT, a citizen of the United States, residing at Los Angeles, in the county of Los Angeles and State of California, have invented new and useful Improvements in Undershot Water Wheels, of which the following is a specification.

Although my present invention may be referred to as an undershot water wheel, it should be understood that numerous features of this invention are suitable for use in water wheels of various types, including not only water wheels used in the generation of power, but also water wheels or paddle wheels which may be used in the application of power either to impart motion to a body of water or to produce movement of a boat or other floating body relatively to a body of water.

It is an object of this invention to provide a water wheel comprising paddles and means for supporting the paddles at a desired inclination, this inclination being variable at will, and my preferred construction being such as to maintain the predetermined inclination of the mentioned paddles throughout their movement in a substantially circular path.

It is an object of this invention to provide a water wheel whose operating parts may be made in a limited number of standard sizes, but which may nevertheless be adapted to be used in conjunction with flumes of various shapes or diameters or inclinations, a preferred embodiment of my invention being such as to permit of the insertion of paddles or blades of a desired length between arms of standard sizes, and such also as to permit of a raising or lowering of an entire set of paddles or blades comprised in a water wheel, the inclusion of the mentioned adjusting means being optional.

It is an object of my invention to provide a comparatively simple but highly effective type of water wheel adapted to be shipped in a disassembled or knocked-down condition, and to be easily assembled at the point of installation; and, in a preferred embodiment of my invention, I may fasten my paddles to paddle-carrying wheels movable upon fixed or offset shafts, these paddle-carrying wheels being spaced apart according to the horizontal diameter of the flume in connection with which my water wheel is to be used.

Broadly, it is an object of this invention to provide a water wheel of rugged construction and adapted to a wide variety of uses, a preferred embodiment of my invention comprising a pair of end shafts mounted upon separate bearings which may be spaced apart to any desired extent, these end shafts being adjustably fixed against rotation and each provided with an offset supporting a paddle-carrying wheel, each paddle-carrying wheel being adapted to support the ends of a set of paddles and being adapted also to transmit power to or to receive power from a crank wheel, which may be coaxial with the mentioned end shaft and may be indirectly connected with or secured to a belt wheel, or the like, by which power may be delivered from or to my novel water wheel.

Other objects of my invention will appear from the following description of a preferred embodiment thereof, and from the appended claims, taken in connection with the accompanying drawings, in which:

Figure 1 is a perspective view showing my water wheel as installed in connection with a flume.

Fig. 2 is a vertical section of a water wheel such as is shown in Figure 1.

Fig. 3 is a transverse section of a water wheel of the character shown in Figures 1 and 2.

Referring to the details of that specific embodiment of my invention which I have chosen for purposes of illustration, 1 may be a flume, whose descending waters are to be utilized in the production of power, and 2 may be a base, optionally extending under said flume and rigidly connecting the upright frame elements 3, 3', respectively adapted to support by means such as the split bearings 4, 4', the end shafts 5, 5', which may be rigidly secured therein, although optionally adjustable by means such as the arms 6, 6', shown as carrying bolts or pins 7, 7', adapted adjustably to engage the end plates 8, 8', comprised in or secured to the frames 3, 3', a series of holes 9, 9' being optionally provided to facilitate the positioning of the said pins or bolts.

Each of the adjustably fixed shafts 5, 5' is preferably indirectly connected with an offset but parallel shaft 10, 10', upon which is rotatably mounted a paddle-carrying wheel 11, provided with a series of circumferential bearings 12, which are preferably uniformly spaced and adapted to pivotally support paddles 13, connected thereto by means of paddle arms 14, shown as keyed on said paddle arm shafts; the outer ends of the said paddle arm shafts being shown as adjustably but rigidly connected, by means comprising set screws 15, or their equivalent to crank arms 16, which are in turn rigidly connected with stub shafts 17, adapted to rotate within circumferential bearings 18, shown as equally spaced about the perimeter of crank wheels 19; all of the mentioned parts from 10 to 19 inclusive being duplicated at opposite ends of the paddles or blades 13, which may be of any suitable dimensions, according to the character and circumstances of the intended installation.

By the construction referred to, it will be obvious that, the mentioned end shafts being optionally held in axial alignment by means such as a bar 20, which may be coaxial with said end shafts, although offset from the shafts 10 upon which the paddle-carrying wheels 11 are rotatably mounted, a rotation of the end shafts 5, 5', by means such as the arms 6, 6', is effective to vary the elevation of the offset shafts 10, therefore simultaneously and correspondingly varying the elevation of all of the paddles 13 and adapting the same to the inclination of a flume or to the depth of water in a flume, in connection with which my water wheel may be employed.

Similarly, it will be obvious that, the inclination of each of the paddles 13 being adjustable in the manner described, either the elevation at which my water wheel operates, or the angle at which the respective paddles are disposed relatively to a vertical plane or relatively to the stream of water delivered by the mentioned flume, may be varied independently and at will, and in a manner determining the efficiency of my wheel.

When a water wheel of the character described is employed for the generation of power, I may secure an additional wheel or wheels, such as the belt wheel 21 and the fly wheel 22 to the respective crank wheels 19, these last mentioned wheels being also free to rotate upon the end shafts 5, 5' and being optionally integral with the crank wheels in connection with which they are used.

In order suitably to confine the water by whose momentum and pressure my water wheel may be driven, it will be obvious that the flume 1 should correspond in configuration to the respective paddles 13; and, in order to prevent the splash of water over the tops of the respective paddles, I may optionally employ also a deflector 23, shown as internal to my water wheel, and as adapted to be supported by means of sleeves 24, which may optionally be secured both to the bar 20, by means such as the set screws 25, and to a fixed stub 26, preferably integral with the offset shafts 10, having a common axis, means such as the additional set screws 27 being optionally employed to secure all of the mentioned parts in a desired relationship, although permitting an adjustment of the deflector plate independently of the respective end shafts.

Although I have referred to the arms 6, 6' as constituting a means for adjusting the elevation of my paddle wheels relatively to a flume, it will be obvious that, assuming, for example, all parts to have been adjusted into the relative positions suggested in Figure 3, a swinging of the offset bearing shafts 10 about the centers of the short shafts 5, 5' would also be effective simultaneously to change the inclination of all of the paddle blades, it being possible, for example, by this means, even to turn all of said blades in such manner as to expose their edges, rather than their flat or curved surfaces, to the impact or pressure of descending water. In the sense just referred to, the arms 6, 6' may be regarded as means for simultaneously changing both the elevation and the inclination of the blades 13, and they may thus be employed to stop my water wheel at will. Although the blades 13 need not be flat, and their edges need not be straight, it is ordinarily advantageous that these blades should be slightly inclined, preferably in such manner that one blade shall serve to deflect water into contact with another blade; and it is an important advantage of my described construction that, although each blade remains long in contact with the water, each blade shall enter and leave the water edgewise, or at a comparatively slight angle, and therefore without encountering avoidable resistance, and any desired number of water wheels may be associated, in a single flume, in such manner as to permit of their independent use or disuse, or the simltaneous or conjoint use of any suitable number thereof.

Although I have herein described but one complete embodiment of my invention, it will be understood that various features thereof might be independently employed and also that various modifications might be made therein without departure from the spirit and scope of my invention, as the same is indicated above and in the following claims.

What I claim is:

1. In a water wheel, a pair of adjustably fixed end shafts provided with offset shafts supporting paddle-carrying wheels, a crank wheel on each end shaft, a paddle-carrying wheel on each offset shaft, and offset means connecting said offset shafts.

2. In a water wheel, a pair of adjustably fixed end shafts provided with offset shafts supporting paddle-carrying wheels, a crank wheel on each end shaft, a paddle-carrying wheel on each offset shaft, and offset means connecting said offset shafts, said offset means being adapted to support a deflector.

3. In a water wheel, a pair of adjustably fixed end shafts provided with offset shafts supporting paddle-carrying wheels, a crank wheel on each end shaft, a paddle-carrying wheel on each offset shaft, and offset means connecting said offset shafts, said offset means being adapted to maintain said end shafts in axial alignment.

In testimony whereof I have signed my name to this specification.

CHESTER P. DENNHARDT.